United States Patent
Saito et al.

(10) Patent No.: US 7,443,521 B2
(45) Date of Patent: Oct. 28, 2008

(54) MODIFYING OF STYLIZED OPERATION OF PERIPHERALS

(75) Inventors: Masanori Saito, Nagano-ken (JP);
Jyunichi Takenuki, Nagano-ken (JP);
Hiraku Kanayama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 858 days.

(21) Appl. No.: 10/916,778

(22) Filed: Aug. 11, 2004

(65) Prior Publication Data

US 2005/0099645 A1  May 12, 2005

(30) Foreign Application Priority Data

Aug. 11, 2003  (JP) ............................... 2003-291675

(51) Int. Cl.
G06F 3/12 (2006.01)
G06F 9/44 (2006.01)
G06F 13/00 (2006.01)

(52) U.S. Cl. ..................... 358/1.13; 358/1.18; 345/520; 710/8; 715/744; 715/866

(58) Field of Classification Search .................. 358/1.6, 358/1.13, 1.18, 1.15; 715/700, 744, 747, 715/866; 710/8; 400/70, 76; 345/520
See application file for complete search history.

(56) References Cited

U.S. PATENT DOCUMENTS

| | | | | |
|---|---|---|---|---|
| 5,604,860 | A | * | 2/1997 | McLaughlin et al. ........ 715/866 |
| 6,869,238 | B2 | * | 3/2005 | Ishiguro .................... 358/1.15 |
| 2003/0030664 | A1 | * | 2/2003 | Parry ......................... 345/744 |
| 2004/0212823 | A1 | * | 10/2004 | Chavers et al. ............. 358/1.15 |
| 2005/0159926 | A1 | * | 7/2005 | Saito .......................... 702/186 |
| 2006/0017948 | A1 | * | 1/2006 | Levin et al. ................ 358/1.13 |
| 2006/0221370 | A1 | * | 10/2006 | Iida ........................... 358/1.13 |
| 2006/0221372 | A1 | * | 10/2006 | Onishi et al. ............... 358/1.13 |
| 2006/0224780 | A1 | * | 10/2006 | Saito ............................. 710/8 |
| 2006/0232810 | A1 | * | 10/2006 | Kishino ...................... 358/1.13 |

(Continued)

FOREIGN PATENT DOCUMENTS

JP  2001-246786  9/2001

(Continued)

OTHER PUBLICATIONS

Abstract of Japanese Patent Publication No. 2001-246786, Pub. Date: Sep. 11, 2001, Patent Abstracts of Japan.

(Continued)

*Primary Examiner*—Kimberly A Williams
(74) *Attorney, Agent, or Firm*—Martine Penilla & Gencarella, LLP

(57) ABSTRACT

When controlling display of a UI for setting working conditions of a peripheral, a plurality of sets of stylized working data specifying working conditions for carrying out stylized operations in the peripheral are stored in a predetermined storage medium; this stylized working data is referred to when displaying a plurality of stylized operation candidates on a predetermined output device, and instruction thereof is handled; setting data indicating settings for working conditions of the handled stylized operation is stored in a predetermined storage medium; a working condition setting instruction is handled, and decision branches for setting working conditions are displayed on a predetermined output device, while handling input of working condition settings; and settings data is updated with settings of working conditions input in the working condition input/output step.

8 Claims, 8 Drawing Sheets

U.S. PATENT DOCUMENTS

| | | | |
|---|---|---|---|
| 2007/0216965 A1* | 9/2007 | Yoshihama | 358/474 |
| 2007/0242286 A1* | 10/2007 | Heo | 358/1.6 |
| 2007/0256009 A1* | 11/2007 | Jung | 715/513 |
| 2007/0268507 A1* | 11/2007 | Kim | 358/1.13 |
| 2008/0016450 A1* | 1/2008 | Aono | 715/747 |

FOREIGN PATENT DOCUMENTS

| | | |
|---|---|---|
| JP | 2001-350606 | 12/2001 |

OTHER PUBLICATIONS

Abstract of Japanese Patent Publication No. 2001-350606, Pub. Date: Dec. 21, 2001, Patent Abstracts of Japan.

* cited by examiner stylized print data designation : postcard reverse(photo)

· ink used : 1 (color)

· print medium size : 2 (postcard)

designation : A4 highest quality

FIG.2

Printer DB

- printer name : PM - * * * *

- driver version : 5.3e

- ink set : pigment, CMYKlclmG

- interdependency relationship

- target item1,2,superordinate item1,superordinate item2···

- target item n,1,superordinate item n1,···,superordinate item nm

- settable range

- target item x,1,superordinate item x1=1,1,2

Resource DB

- printer name : PM – * * * *
- driver version: 5.3e
- ink set: pigment, CMYKlclmG
- settable range

- target item 1,2,superordinate item 1=2,superordinate item2=1,1

- target item n,m,superordinate item n1=1···superordinate item ml=3,2,3

FIG.4

MODIFYING OF STYLIZED OPERATION OF PERIPHERALS

BACKGROUND OF THE INVENTION

1. Field of the Invention

The present invention relates to a UI controller, a UI control method, a UI control program product, a print controller, a print control method, and a print control program product.

2. Description of the Related Art

Ordinarily, a control program referred to as a driver is used in order to drive a computer peripheral, such as a printer. In the driver, working condition settings for driving the peripheral are received, and the peripheral is driven in accordance with these settings. Typically, a UI (User Interface) is displayed on a display or the like, and working condition settings are made by the user through this UI. Even in an arrangement where many functions are possible to realize in a peripheral, most users will use the peripheral for the same purpose. Accordingly, working conditions for realizing certain functions realizable by a peripheral in question are defined in advance, and "presets" for carrying out these stylized operations are selectable on the UI.

SUMMARY OF THE INVENTION

In the conventional art described above, while a peripheral can be made to perform a stylized operation simply by selecting stylized printing on the UI, it was not possible to drive the peripheral while modifying a portion of the working conditions in a stylized operation. That is, even where a stylized operation meets the purposes of the majority of users, it is not always the case that driving a peripheral according to a stylized operation will meet the purposes of all users. In order to meet a variety of user needs, it would be preferable to be able to make settings for some driving conditions that differ from driving conditions of a stylized operation, even where the operation being carried out is generally similar to the stylized operation. With the foregoing in view, it is an object of present invention to provide a UI controller, a UI control method, a UI control program product, a print controller, a print control method, and a print control program product, whereby it is possible to modify a portion of the working conditions when carrying out a stylized operation by the peripheral.

In order to achieve the aforementioned object in the present invention, standard drive data for carrying out stylized operations is stored in memory in advance in a predetermined storage medium, and on the basis of this data, potential stylized operation candidates are displayed on the UI. In order to enable setting of working conditions for a stylized operation by means of selecting a stylized operation candidate on the UI, settings data indicating working conditions for the selected stylized operation is recorded. In the present invention, a working condition setting corresponding to the specified working condition setting are received, and the aforementioned settings data updated in accordance with input of this setting.

That is, the UI is designed to enable selection of a stylized operation, as well as to enable more advanced settings of working conditions where required, by means of which design it becomes possible to modify a portion of the working conditions when performing a stylized operation with the peripheral. As a result, it becomes possible to very easily set most working conditions by means of only a single selection operation simply by selecting a stylized operation, while also enabling more advanced settings depending on the needs of the user, so as to provide a more convenient UI.

Here, a peripheral may be any device connectable to and drivable by a computer; various kinds of devices fall into the class of such peripherals. For example, an output device such as a printer, display or projector connected to a computer to carry out image output operations, an input device such as a scanner or digital camera connected to a computer to carry out image input operations, a recording device such as a hard disk drive connected to a computer to carry out data recording operations, or various other devices could serve as peripherals.

A stylized operation can be any operation for achieving a particular purpose in a peripheral, and may be determined in various ways. For example, an arrangement whereby the specifics and purpose of a stylized operation are specified by determining working conditions for carrying out a stylized operation, or whereby the specifics and purpose of a stylized operation are specified by sensory description, are possible. More specifically, in a printing device, stylized printing could be specified by identifying printing conditions such as paper size, paper type and printing speed, e.g. "A4, plain paper, (fast)"; or stylized printing could be specified by a sensory description such as "highest quality" or "very pretty", or by any of various other arrangements. In the case of a projector, there could be employed various arrangements such as specifying a stylized operation by means of the size of the presentation hall, or the type of image being projected.

It is sufficient for stylized working data to consist of data specifying working conditions for carrying out stylized operations of various kinds in a peripheral; a minimum set of working conditions needed to carry out a stylized operation may be specified, or all working conditions needed to carry out a stylized operation may be specified. In order to carry out the stylized operation of the preceding example, namely, "A4, plain paper, (fast)," the minimum set of working conditions needing to be set as print conditions would be the printer paper size, type of printer paper, and the "fast" print setting from among the possible print speeds for that size and type. Where all working conditions needed to carry out a stylized operation are to be specified, there could be specified additionally the margin settings on the printer paper, the presence of any graphics processing, and the like.

In the stylized working instruction handler, it is sufficient to be able to refer to the aforementioned multiple sets of stylized working data and to display candidate stylized operations on the UI; this may employ any of various arrangements. Here, it is sufficient to provide an interface for displaying the UI and handling stylized operation instructions, for example, an arrangement whereby working condition decision branches are displayed on a predetermined output device such as a display, with the user being able to input desired settings using an input device such as a keyboard or mouse. As working condition candidates, it would be possible to display all of the aforementioned multiple sets of stylized working data, or to display a portion thereof. In environments where certain stylized operations may not be enabled due to peripheral connections or limitations of functions in individual devices, some stylized operations may not be displayed on the UI, or displayed but shown as disabled.

In the settings data storage medium, it is sufficient to be able to store settings data indicating working conditions for stylized operations, and at a minimum to store settings data indicating working conditions of a stylized operation for which an instruction has been handled by the aforementioned stylized working instruction handler. Where, as described above, stylized working data consists of data specifying a minimum set of working conditions needed to carry out a stylized operation, with other working conditions for driving the peripheral being set automatically, data indicating settings after being set is stored in memory in the settings data storage medium. In this case, an arrangement in which setting specifics are explicit could be employed. Here, working condition settings merely need values that correspond with conditions, and are not limited to numerical values. That is, cases in which working conditions are specified by text strings are includes as well. However, an arrangement wherein numerical values are associated with conditions in a device handled by a computer, and working conditions are indicated by numerical values, is preferred.

In this settings data storage medium, it is sufficient to be able to store settings in memory on a provisional basis prior to driving a peripheral. Accordingly, an arrangement wherein, for example, settings are stored in RAM as the work area of the UI controller would be acceptable. Since RAM affords faster access than other memory devices, for example, EEPROM or an HDD, the process can proceed faster where settings data is placed in RAM. Of course, in terms of storing settings data in memory, EEPROM or an HDD could be used.

Like the stylized working instruction handler described above, a working condition input/output interface is able to carry out UI display and predetermined input instructions; any of various arrangements could be employed, provided it is possible to display decision branches for setting working conditions and enable selection thereof. As working conditions for display on the UI, it would be acceptable to select working conditions appropriately required for a particular purpose when controlling a peripheral. For example, it would be possible to employ an arrangement wherein stylized operation working conditions that are often modified are selected as working conditions for display.

In the settings data updater, it is sufficient to be able to update specifics stored in the aforementioned settings data storage medium by means of input working condition settings. In such an arrangement, wherein settings data is updated as needed, it is possible to store in memory settings data for carrying out a stylized operation simply by selecting the stylized operation on the UI, and once a stylized operation has been selected from the UI, to make more advanced settings of working conditions in order to update settings data so that settings data for settings depending on user needs can be stored in memory. Where settings data is stored in memory, there becomes possible an arrangement whereby input of a drive start instruction for a peripheral can be handled, and settings for the drive means made in response to this instruction, so that the peripheral can be driven in accordance with these settings.

Specifically, when making settings in this UI, settings are stored in a predetermined storage medium, but are not actually carried out for the driver or other drive means for driving the peripheral; however, as long as it is possible, in response to a drive start instruction for the peripheral, to carry out driving thereof in accordance with these settings, it will be possible to carry out stylized operations as well as to carry out operations other than stylized operations. In particular, in cases where it is desired to modify certain working conditions for driving a peripheral, it becomes very easy to complete the settings and drive the device. In an arrangement such as that described above, where settings selected from the UI are updated without making actual settings for the drive means, the UI can be designed simply by making reference to the settings, whereby display and update on the UI can be accomplished faster than with an arrangement whereby subsequent setting of drive means is performed, in response to input via the UI.

In the working condition input/output interface, there may be employed an arrangement for setting working conditions; by way of an example of a suitable arrangement thereof, it would be possible to design one whereby, on the basis of interdependency among the working conditions being set and the settable ranges therefor, appropriate settable ranges are always presented automatically for the working conditions being set. For this purpose, interdependency data and settable range data will be stored in advance in a predetermined storage medium and reference made to this data. Here, the working condition input/output interface performs display of appropriate settable range on the basis of settable range data, and for interdependent working conditions, updates settable range by means of the working conditions updater.

Specifically, there are instances where, in a peripheral, a different setting of a specific working condition may cause a change in the settable range of a setting for another working condition; in such instances, interdependency is considered to exist between the working conditions. Where a setting for a working condition has been made by means of the aforementioned working condition input/output interface, and the working condition set thusly is interdependent with another working condition, the settable range may vary. Accordingly, it is possible to employ an arrangement wherein when the aforementioned decision branches are displayed by the working condition input/output interface, reference is made to the aforementioned settable range data to acquire a settable range, the settable range for the interdependent working condition is acquired by the working condition updater, and the UI is updated in order to display the proper settable range on the UI.

In order to properly display settable range in an update of the UI display, it is sufficient to make reference to interdependency data and settable range data stored in the predetermined storage medium, so in this case as well, the UI display can be updated without actually making settings for the drive means. Accordingly, there is no need in response to input from the UI to make subsequent settings to the drive means or to query the drive means as to settable ranges for those settings, so that UI display and updates may be carried out faster.

In the working condition updater, it is sufficient to be able to update the UI, and when a working condition setting has been input on the UI, to display the input setting in association therewith, as well as to update settable range for any other interdependent working condition where necessary. Accordingly, it should be able to identify, by means of interdependency data, any working condition having interdependency with the working condition for which a setting has been input, and to acquire from the settable range data a settable range for the identified working condition.

It is sufficient that interdependency data identify interdependent working conditions where a relationship of interdependency exists; various formats may be employed. As a specific favorable example of interdependency data, there could be employed data that associates working conditions with one another in the event that a change in the setting of one specific working condition causes a change in the range of settings settable by means of another working condition. More specifically, interdependent working conditions may be described on a predetermined segment-by-segment basis, employing data that catalogs interdependent working conditions in a single segment. An interdependency relationship can also be a condition in which a change of setting for a specific working condition causes change of the range of settings settable for another working condition; such specific working conditions should be ascertained in advance. Accordingly, it is preferable to employ a data structure having specific rules, such as designating such a specific working condition as a superordinate condition for the other condition and describing a certain working condition in terms of its superordinate condition; or conversely describing a subordinate working condition for a certain working condition.

It is sufficient that settable range data be able to identify settable ranges of settings for working conditions; of course, where a relationship of interdependency exists between a specific working condition and another working condition, settable range data will consist of data identifying the specific working condition and data identifying settable range for the other working condition at this setting. As a specific favorable example of settable range data, there could be employed an arrangement wherein, on the premise that a working condition interdependent with respect to a prescribed working condition targeted for prescription of a settable range therefor is a specific condition, data indicating settable range for the prescribed working condition would be used in the event of that specific condition being met.

Where the concept of determining whether another working condition represents a superordinate condition for a certain working condition in the manner described above is employed, by identifying a setting for a condition that represents a superordinate condition for a prescribed working condition and prescribing a settable range where the superordinate condition has this setting, it is possible to create settable range data easily. Of course, in this case as well, it would also be possible to describe a superordinate condition and setting thereof in one segment, and to employ data describing settable range for a prescribed working condition.

Settable range data may also be constituted including text string data that indicates a working condition. That is, when displaying working condition decision branches on the UI, there are some instances in which it is preferable for a text string on the UI to change in accordance with a change in settable range; by providing text string data as settable range data, it is possible to easily modify a text string on the UI using this text string data. As a result, it is possible to provide a UI that is very easy to understand.

Additionally, in an arrangement wherein a peripheral is driven by a driver or other drive means, with setting of working conditions for the drive means and acquisition of settable ranges therefor being carried out through an interface, it is possible to create the settable range data described above by means of storing the aforementioned interdependency data in a storage medium in advance. Accordingly, when a peripheral manufacturer provides a driver program or the like for the purpose of realizing by means of a computer the UI controller pertaining to the present invention, it will suffice to provide the user with pre-created aforementioned interdependency data and a program for creating the aforementioned settable range data, so as to reduce the size of the provided data and program, and the number of operational steps.

In particular, since there is a possibility that the details of settable range data may need to be modified due to a version upgrade or the like, by employing an arrangement wherein settable range data can be generated by a settable range data generator, and wherein only interdependency data is rewritten prior to a version upgrade, it becomes possible to easily provide settable range data corresponding to a version upgrade or the like. In the settable range data generator, since a settable range for a working condition can be acquired via drive means via an interface, by making reference to interdependency data, a condition can be set for a superordinate working condition in an interdependency relationship, while acquiring a settable range for a subordinate working condition.

Furthermore, since settable range data is needed during UI display, settable range data is generated by the settable range data generator prior to driving the peripheral. An interface may be utilized as necessary when acquiring settable range for a working condition by means of the settable range data generator, but of course since this will be an interface for the aforementioned driver or other drive means, when actually driving the peripheral, working conditions will be set for the drive means using this interface.

Additionally, in an arrangement whereby settable range data is generated from interdependency data by a settable range data generator, it is not essential that settable range data be created in advance for all possible working conditions of a peripheral. For example, where interdependent working conditions are extremely numerous, there may be employed an arrangement whereby settable range data is not created for working conditions requiring an extremely large amount of time to do so, or for working conditions having low frequency of use on the UI. By means of such an arrangement, the time needed to generate settable range data can be kept shorter.

Under a condition in which settable range data has not been generated for all working conditions by the settable range data generator, if becomes necessary to display on the UI working conditions that have not yet been generated, the settable range data for these may be acquired via the interface. Specifically, since setting of working conditions and acquisition of settable ranges can be carried out by means of the interface, while the arrangement is more time consuming than one in which settable ranges are pre-stored in storage means, there will be no instances in which settable range data for a working condition cannot be acquired. Settable range data to be generated in advance can be selected appropriately, depending on whether it is more important to reduce the time required when generating settable range data as described above, or to reduce the frequency of acquisition of settable range data via the interface.

By way of an exemplary arrangement in a case in which stylized operation data consists of data prescribing settings for the minimum required working conditions to carry out a stylized operation, with other working conditions for driving a peripheral being set automatically, it would be possible to employ an arrangement whereby conditions for these other working conditions are selected and set according to an order of precedence determined in advance. Specifically, for each working condition, there can exist a settable range for each item thereof so that a decision branch exists for the working condition; by specifying an order of precedence for conditions on an item-by-item basis, there can readily be provided a selection criterion for selecting conditions. The aforementioned other working conditions can be determined easily in accordance with this selection criterion.

Where settable range data is utilized in the present invention, in the event that interdependency exists among working conditions, since settable ranges for the aforementioned other working conditions may vary depending on setting of a specific working condition, by selecting a condition and specifying a setting according to an order of precedence within a settable range, it becomes possible to extract an appropriate condition according to the order of precedence, without selecting any conditions which are non-selectable. By using such settings data that includes data other than minimum required working conditions for carrying out a stylized operation, it becomes possible to drive a peripheral at this setting.

An order of precedence can be determined by means of various criteria. For example, where a working condition setting is represented by a numeric value, precedence may be determined in ascending order or descending order of the numeric value, or may be determined by means of a function realized by the peripheral. For example, by way of an example of determining precedence according to a function realized by a peripheral, there could be employed the operating speed of the peripheral, quality of a function obtained by means of the peripheral, or the like. The former would be equivalent to determining in order of printing speed in the case of a printing device, or in order of scanning speed in the case of a scanner; the latter would be equivalent to determining in order of resolution or type of graphics processing in the case of a printing device, or in order of image resolution in the case of a scanner. In either case, by determining an order of precedence in advance, working conditions can be determined readily. Of course, precedence may be determined in advance for each stylized operation, or precedence may vary on an individual stylized operation basis.

By means of arrangements such as those described hereinabove, it is possible to readily select settings for realizing a stylized operation even where the stylized operation is specified in terms of sensory description as described previously. For example, in order to realize a "very pretty" stylized operation, by assigning higher precedence to working conditions that give higher picture quality arrangement whereby conditions for these other working conditions are selected and set according to an order of precedence determined in advance. Specifically, for each working condition, there can exist a settable range for each item thereof so that a decision branch exists for the working condition; by specifying an order of precedence for conditions on an item-by-item basis, there can readily be provided a selection criterion for selecting conditions. The aforementioned other working conditions can be determined easily in accordance with this selection criterion.

Where settable range data is utilized in the present invention, in the event that interdependency exists among working conditions, since settable ranges for the aforementioned other working conditions may vary depending on setting of a specific working condition, by selecting a condition and specifying a setting according to an order of precedence within a settable range, it becomes possible to extract an appropriate condition according to the order of precedence, without selecting any conditions which are non-selectable. By using such settings data that includes data other than minimum required working conditions for carrying out a stylized operation, it becomes possible to drive a peripheral at this setting.

An order of precedence can be determined by means of various criteria. For example, where a working condition setting is represented by a numeric value, precedence may be determined in ascending order or descending order of the numeric value, or may be determined by means of a function realized by the peripheral. For example, by way of an example of determining precedence according to a function realized by a peripheral, there could be employed the operating speed of the peripheral, quality of a function obtained by means of the peripheral, or the like. The former would be equivalent to determining in order of printing speed in the case of a printing device, or in order of scanning speed in the case of a scanner; the latter would be equivalent to determining in order of resolution or type of graphics processing in the case of a printing device, or in order of image resolution in the case of a scanner. In either case, by determining an order of precedence in advance, working conditions can be determined readily. Of course, precedence may be determined in advance for each stylized operation, or precedence may vary on an individual stylized operation basis.

By means of arrangements such as those described hereinabove, it is possible to readily select settings for realizing a stylized operation even where the stylized operation is specified in terms of sensory description as described previously. For example, in order to realize a "very pretty" stylized operation, by assigning higher precedence to working conditions that give higher picture quality and selecting working conditions within the settable range in this order of precedence, it is possible to obtain the best picture quality result possible with the peripheral to realize a "very pretty" stylized operation.

Further, in an arrangement wherein settable range data is generated from interdependency data by a settable range data generator, an arrangement is possible whereby interdependency data is described in a first file, and interdependency data and settable range data is described in a second file. However, an arrangement wherein only interdependency data is described in the first file is not essential. In particular, by employing an arrangement wherein settable range data can be described in the first file as well, and wherein when referring to settable range data of a specific working condition by means of the working condition updater, the second file and the first file are searched in that order, it is possible to have an arrangement whereby under normal circumstance settable range data is acquired on the basis of the second file, while realizing a procedure of referring to the first file for settable range data which is not described in the second file.

Specifically, when creating the second file from the first file, by constituting the second file so that as to not contain settable ranges for all working conditions, it is possible to avoid taking an excessively long period of time. In this case as well, by ascertaining in advance settable range data for working conditions not described in the second file, and describing these in the first file, the settable range data can be acquired by referring to this file. Accordingly, there will be no need to acquire settable range via the interface, making it possible to increase processing speed as well as reducing the time required to create the second file.

Additionally, in the case of an arrangement wherein a settable range data generator generates settable range data for some working conditions, to provide for instances in which, due to a slight change occurring in a peripheral driver or to an error or the like, a settable range cannot be acquired properly from the drive means, some of the settable range data may be created in advance and included in the interdependency data. That is, where some settable range data has been included in interdependency data, the settable range data can be acquired by making reference to the interdependency data. By so doing, it becomes possible to correctly acquire settable range data even where slight change occurring in a peripheral driver, or an error has occurred.

The method for allowing advanced settings to be made in addition to specifying a stylized operation is not necessarily limited to physical devices, a method invention being effective as well. As the inventive idea may be reduced to practice in various modes, for example, the UI controller described above may in some instances exist independently, or be utilized in a form incorporated into a certain device. Modifications, such as the choice between a software or hardware arrangement, may be made as appropriate.

Where, as a specific example, the inventive idea is embodied as UI controller software, the software will also correspond to the invention. As an example thereof, the invention may be designated as a UI controller program product. Of course, the storage medium therefor may consist of a magnetic storage medium or a magnetooptical storage medium; any storage medium developed in the future could be considered completely analogously. Any reproduction stage, whether it be a primary reproduction, secondary reproduction, or the like, is also equivalent without any doubt whatsoever.

Further, where a printer is employed as a peripheral, it will be possible to appropriately update the UI according to interdependency data and settable range data in an arrangement wherein by printing conditions are set by way of working conditions and printing executed means of a UI as described previously. Accordingly, the invention can be reduced to practice as a print controller, print control method, or print control program product.

BRIEF DESCRIPTION OF THE DRAWINGS

FIG. 2 is an illustration showing a stylized print data description example.

FIG. 3 is an illustration showing a printer DB data description example.

FIG. 4 is an illustration showing a resource DB data description example.

DETAILED DESCRIPTION

Figure 1:
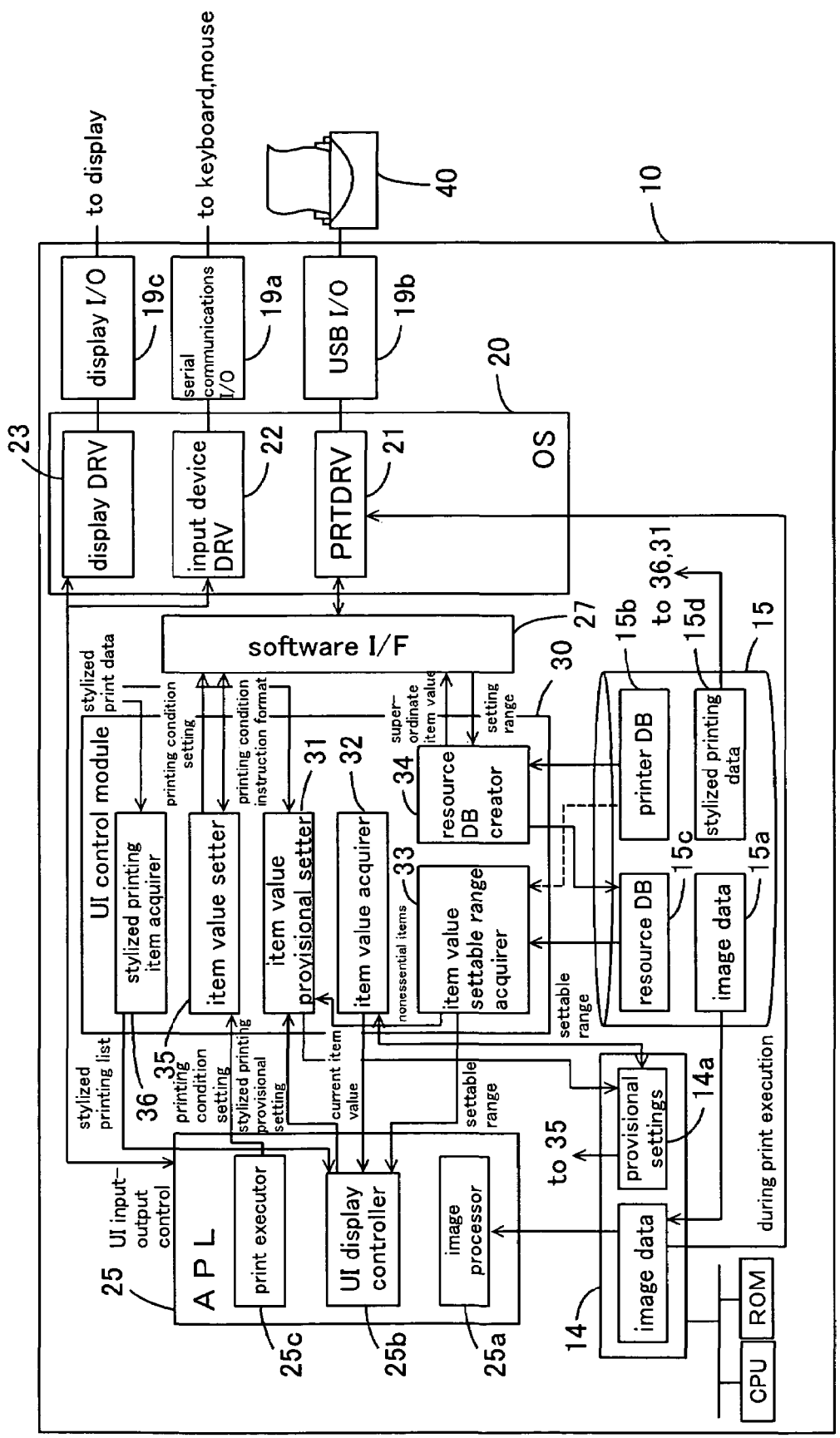
FIG. 1 is a block diagram showing a simplified arrangement of a print controller.

The following description of the embodiments of the invention will be made according to the order indicated below.
(1) Arrangement of the Invention:
   (1-1) Arrangement of UI Control Module:
(2) Arrangement of Stylized Print Data:
(3) Arrangement of Printer DB:
(4) Arrangement of Resource DB:
(5) Print Control Process and UI Display Example:
(6) Other Embodiments (1) Arrangement of the Invention FIG. 1 is a block diagram showing a simplified arrangement of a computer employed as a print controller pertaining to the invention. Computer 10 comprises a CPU serving as the center of operations and ROM, RAM 14 or the like serving as storage media, the computer being able to execute a predetermined program while utilizing a peripheral such as an HDD 15. Operating input devices such as a keyboard and mouse are connected to the computer 10 via a serial communications I/O 19*a*, and a display for image display is connected via a display I/O 19*c*. A printer 40 is connected via a USB I/O 19*b*.

The printer 40 in this embodiment comprises a mechanism having a detachable ink cartridge for each color, these being filled with inks of several colors. The mechanism can accommodate cartridges of CMYKlcImG (cyan, magenta, yellow, black, light cyan, light magenta, gray) inks. The printer 40 in this embodiment can also use two kinds of K ink as K ink, namely, photo black for use on glossy paper and plain paper, and matte black with preference to image quality on matte paper.

In printer 40, either kind of K ink may be used, and instead of G ink, it would be possible to install and use two matte black ink cartridges. G ink is ink consisting of black coloring matter in a solvent, but since the concentration of the coloring matter is lower than that of black ink, by using G ink, it is possible to reproduce tone changes with a high degree of accuracy. Also, in a printer 40, inks may be combined to produce a multitude of colors, and to thereby form an image on a print medium.

Of course, the ink colors useable in printer 40 are only exemplary, it being possible instead to use dark yellow ink, or to use red ink or violet ink, or to use achromatic ink to adjust glossy appearance. Nor is the number of colors limited to seven, nor are the color combinations limited to the combinations mentioned above. The printer 40 in this embodiment is a printer of so-called ink jet format, wherein force is exerted on inks contained within an ink head filled with the inks, to eject the inks. Here, ejecting force may be exerted on the ink by applying voltage to a piezo element, or ejecting force may be exerted on the ink by forming bubbles within the head. The invention is also applicable to printers of various other types besides ink jet format, such as laser format.

To describe the computer 10 in a somewhat simplified manner, one having a configuration typical for a personal computer may be used. Of course, the invention is not limited to implementation in a personal computer. Nor is there any need to limit the interface connecting the computer 10 and printer 40 to that described above, it being possible to employ various other connection configurations, such as a parallel interface or SCSI connection, wireless link, or any other connection configuration that may be developed in the future.

Further, while in this embodiment the print controller is composed of a computer 10, the print controller of the invention could instead be reduced to practice by means of a program execution environment installed in printer 40, with image data being acquired from a digital camera connected directly to printer 40, which carries out the print control process. The UI may be displayed on a small LCD panel on printer 40, or on an LCD panel provided to the digital camera. Of course, in a similar arrangements the print control process could be carried out by the digital camera; the print control process pertaining to the invention could be carried out by distributed processing; or any of various other arrangements could be employed. The print control process pertaining to the invention could also be carried out by a so-called multi-function device that combines in a single unit a scanner for scanning images and a printer for printing images.

In the computer 10 pertaining to this embodiment, the OS 20 incorporates a printer driver (PRTDRV) 21, an input device driver (DRV) 22, and a display driver (DRV) 23. Display DRV 23 is a driver for controlling display of image data and the like on a display; input device DRV 22 is a driver for receiving a code signal from the aforementioned keyboard or mouse via the serial communications I/O 19*a* and handling a predetermined input operation.

APL 25 is an application program able to execute color image retouching or the like; a user, by operating an aforementioned operation input device under execution of APL 25, can print a color image from printer 40. That is, in response to a user instruction the image processor 25*a* of APL 25 reads into to RAM 14 image data 15*a* stored on HDD 15, and via the display DRV 23 displays on the display an image based on the image data 15*a*. When the user operates the aforementioned input device, the content of the operation is acquired via input device DRV 22 and the content interpreted, whereupon the image processor 25*a* carries out image processing, such as contrast adjustment, depending on the control content.

The aforementioned image data 15*a* is data of dot matrix form wherein the RGB (red, green, blue) color components are tone represented to specify color of each pixel; in this embodiment, there are 256 tones for each color, the image data employing a color system in accordance with the sRGB standard. While this color data 15*a* is used as an example in this embodiment, various other kinds of data could be employed, such as JPEG image data using the YCbCr color system, image data using the CMYK color system, or the like. Of course, the invention could also be implemented for data based on the Exif 2.2 standard (Exif is a registered trademark of the Japan Electronics and Information Technology Industries Association) or data in accordance with Print Image Matching (PIM; registered trademark of Seiko-Epson Corp.).

In APL 25, it is possible to execute printing from printer 40 of an image or the like subsequent to image processing in image processor 25*a*; during printing, a UI enabling printing condition items settings to be made is displayed to the user, and printing is executed according to instructions made from the UI. Further, with this UI it is possible to display a simplified UI that does not require the user to make a large number of print condition settings, but that rather prompts selection of a desired style from among a multiplicity of stylized printing [templates] established in advance, and that, for a user who wants to make more advanced printing condition settings, displays an advanced setting UI when selected by the user, so as to be able to perform advanced settings as well. Thus, APL 25 comprises a UI display controller 25*b* and a print executor 25*c*, with data for displaying a UI for setting printing condition items on UI display controller 25*b* being output to display DRV 23. Data indicating settable ranges for and interdependencies among printing condition items to be displayed on the UI is acquired from the UI control module 30.

Printing condition items are items for a plurality of conditions required in order to execute printing, and include various printing condition items settable in PRTDRV 21, such as print resolution, ink type (color/monochrome selection or ink set (ink color combination) selection), print medium type and size, layout during printing, borderless printing enabled/disabled, print quality (high quality vs. high speed, etc.), type of color management (auto-adjust enabled/disabled, use of colors outside the display gamut enabled/disabled, etc.), bidirectional printing enabled/disabled, image processing by driver enabled/disabled, and the like. In this embodiment, print conditions such as print resolution, ink type and the other items mentioned above are set on an item-by-item basis, so different print conditions can be distinguished by way of items. Also, the particulars of each print condition setting are specified by a numeric value (setting) corresponding to the particulars thereof, and these numeric values are referred to as item values.

UI display controller 25*b* displays the aforementioned UI on the display, acquires via the aforementioned input device DRV 22 the content of an operation input performed by the user, and ascertains which stylized printing template has been specified by the operation input. Here, for each stylized printing template, there are simply determined in advance item values for a plurality of print condition items necessary for carrying out stylized printing; once a stylized printing template has been specified, the UI display controller 25*b* acquires the aforementioned predetermined item values, while for other items, item values that have been set automatically are acquired.

That is, for items other than those items that have been predetermined by way of a stylized printing template but that are required to execute printing, the UI control module 30 determines item values according to an order of precedence and settable range described later, and hands these over to UI display controller 25*b*. Item values for a stylized printing template determined in this manner and item values for the aforementioned advanced setting target items are held as provisional settings. In some instances, an item value settable in a printing condition item may be dependent upon an item value of another printing condition item; in such instances, it is possible that setting a certain item value will cause the range of an item settable for another printing condition item to vary.

The UI display controller 25*b* acquires from the UI control module 30 data indicating settable range and interdependencies among items as described above, and is thus able to refer to this data to update the UI display for other print condition items whose settable range is affected by setting a certain item value. That is, since item values of print condition items can be modified in the advanced settings described above, in the event that settable ranges for another item changes due to such a modification, the settable range can nevertheless be modified properly on the UI display.

Advanced setting target items for which advanced settings are made need simply be selected arbitrarily and established as advanced setting targets in advance by the designer of the APL 25; such items may include all printing condition items, or only some printing condition items. An arrangement wherein printing condition items essential for carrying out the aforementioned stylized printing are modifiable, or one in which printing condition items essential for carrying out the aforementioned stylized printing cannot be modified, is acceptable. By means of such an arrangement, it is possible to accommodate both the needs of the user who simply desires to set printing conditions and execute printing by means of a stylized printing template, and the needs of the user who desires to modify the stylized printing template settings for printing.

In this UI, it is possible to carry out a print execute instruction, and when UI display controller 25*b* detects the print execute instruction on the basis of the content of an operation on the UI, a process carried out by print executor 25*c* commences. As printing conditions in PRTDRV 21, the print executor 25*c* sets up item values of printing condition items held as provisional settings in the manner described above and hands over the image data targeted for printing to PRTDRV 21. PRTDRV 21 further comprises modules, not shown, for performing resolution conversion, color conversion, halftone processing, and other processes; the modules generate print data by carrying out processes depending on item values of printing condition items on print target data targeted for printing. The print data so generated is then output to printer 40 via USB I/O 19*b*, whereupon printer 40 executes printing on the basis of the print data.

(1-1) Arrangement of UI Control Module:

The aforementioned UI control module 30 administers a process of handing over to the aforementioned UI display controller 25*b* data indicating item values for printing condition items and settable range and interdependency relationships for printing condition items needed for UI display, as well as item values in stylized printing templates. In this embodiment, the arrangement employed is such that stylized printing whereby printing conditions are set easily can be executed by this module, and such that when making advanced settings, the UI display can be modified quickly and properly in response to a change in item values for printing conditions that have complex interdependencies. Thus, UI control module 30 comprises an item value provisional setter 31, an item value acquirer 32, an item value settable range acquirer 33, a resource DB creator 34, an item value setter 35, and a stylized printing item acquirer 36.

The UI control module 30 comprises a stylized printing item acquirer 36 so as to be able to display a list of stylized printing templates in UI display controller 25*b*; stylized printing data 15*d* is recorded in advance on HDD 15 as data for reference by the stylized printing item acquirer 36. Stylized printing data 15d has recorded therein designations of a multiplicity of stylized printing templates and data indicating item values for printing condition items necessary to carry out each type of stylized printing.

The stylized printing item acquirer 36 makes reference to the stylized printing data 15d in order to acquire the designations of the aforementioned multiplicity of stylized printing templates, and transfers data indicating the designations to the aforementioned UI display controller 25b. By so doing, the UI display controller 25b is able to display a list of a multiplicity of stylized printing templates. When designation of a stylized printing template is received in UI display controller 25b, data indicating the designated stylized printing template is transferred to the item value provisional setter 31, whereupon the item value provisional setter 31 sets provisional printing condition values for carrying out that stylized printing.

Specifically, with regard to the transferred stylized printing, for item values described by the aforementioned stylized printing data 15d, these are acquired by making reference to the stylized printing data 15d, for use as provisional settings. For item values not described in the stylized printing data 15d, the item value provisional setter 31 makes provision settings automatically. Item values provisionally set in this way are recorded in RAM 14 as provisional settings 14a.

When the item value provisional setter 31 performs automatic provisional setting for item values not described in stylized printing data 15d, it refers to an order of precedence determined in advance for printing condition items, and to settable ranges for item values. In this embodiment, the order of precedence is according to size of each item value. That is, settings for items in this embodiment are specified in terms of numerical values, i.e.: 1, 2, . . . "etc., with "1" having the highest precedence and decreasing in precedence with larger values.

Additionally, a settable range is a value settable as an item value in each printing condition item; the settable range for an item value of another printing condition item can vary with a change in the item value of a specific printing condition item (herein, the former is termed a superordinate value and the latter a subordinate value). In this embodiment, settable ranges and interdependency relationships for items can be acquired by referring to a database created in advance. Thus, at least prior to initiating UI control, printer DB 15b and resource DB 15c are recorded on HDD 15.

In this embodiment, printer DB 15b is a database describing interdependency relationships among printing condition items, and is recorded on HDD 15 when PRTDRV 21 is installed. Resource DB 15c has recorded therein superordinate items for printing condition items and printing condition item values at those superordinate item values. Accordingly, when the item value of a certain printing condition item changes, it is possible to acquire any item value assumable by a printing condition item having this item as a superordinate item, i.e. it is possible to acquire a settable range.

The resource DB creator 34 of UI control module 30 utilizes the software I/F 27 to refer to the aforementioned printer DB 15b and create resource DB 15c. That is, software I/F 27 has an arrangement that enables exchange of data with PRTDRV 21 to be able to acquire item values, acquire settable ranges and set item values; resource DB creator 34 acquires settable ranges for item values having interdependency relationships, while setting items value via software I/F 27.

As described hereinabove, printing conditions exist in interdependent relationships, and a settable range for a specific printing condition item can be acquired by means of software I/F 27, with the superordinate item value for the specific printing condition item held constant. Accordingly, by repeating the procedure for setting all values assumable by a superordinate item and acquiring settable ranges, it is possible to acquire settable ranges and interdependency relationships for specific printing condition items. Of course, there is no need for a repeat procedure for printing condition items having no interdependency.

In this software I/F 27, while a predetermined processing time is required, it is possible thereby to acquire settable ranges by means of the aforementioned repeat procedure. Thus, data indicating interdependency relationships and settable ranges can be created as resource DB 15c. Of course, settable ranges can be created in DB 15c for printing condition items lacking the aforementioned interdependency relationships as well.

In this embodiment, resource DB 15c is created during initial execution of printing that designates printer 40 in computer 10, and once created in this manner are held in HDD 15. Accordingly, in this embodiment, it can be said that both the resource DB 15c and the printer DB 15b are created in advance during execution of printing. The contents of each kind of database will be described in detail hereinbelow.

With resource DB 15c having been created in this manner, in order for provisional settings to be made automatically by item value provisional setter 31 for item values not described by the stylized printing data 15d, the item value settable range acquirer 33 refers to the resource DB 15c and transfers data indicating settable ranges of printing condition items to the item value provisional setter 31. The item value provisional setter 31 then provisionally sets item values as-needed, starting from the highest order item among item values of printing condition items not described in the aforementioned stylized printing data 15d.

Here, when the item value provisional setter 31 is determining an item value for a specific printing condition item, it ascertains the provisional setting for the superordinate item thereof as well as referring to data transferred from the item value settable range acquirer 33, to acquire a settable range for the specific printing condition item; it then selects therefrom the item value having the highest precedence for use as the provisional setting. When making settings for the most superordinate item, since this item is not dependent on any superordinate item, the item value having the highest precedence within the settable range of the item is used as the provisional setting.

In the above manner, whereas from the user's perspective a stylized printing is simply selected on the UI, by means of this procedure printing conditions necessary for executing stylized printing are provisionally set. Provisional settings 14a are simply provisionally set item values stored in RAM 14; while settings are not actually set in PRTDRV 21, when the user by means of the UI determines an item value of a printing condition item and issues a print execute instruction, the item value setter 35 performs setting of the item value via software I/F 27. The item value setter 35 is able to interpret the data format for specifying printing conditions to PRTDRV 21 via software I/F 27, as well as setting item values for printing condition items for PRTDRV 21 while conforming to the data format.

Specifically, making reference to provisional settings 14a in RAM 14, it creates data of the aforementioned format such that item values of printing condition items assume the values indicated by provisional settings 14a. When the data is then transferred to software I/F 27, item values of printing condition items are set in PRTDRV 21 in the manner described in the data. In view of the fact that the arrangement for specifying printing conditions differs by OS, the arrangement for setting printing conditions with data of predetermined format via software I/F 27 is an arrangement that compensates for this so that data processing for UI display can be carried out without any awareness of differences due to the OS, at least in APL 25.

That is, in each OS there is typically provided a function for setting item values for printing condition items for PRTDRV 21, but the method of setting printing conditions differs by OS. Accordingly, in the present embodiment, there is employed an arrangement whereby UI display is controllable by UI control module 30 by means of a universal method that is not OS-dependent; during actual execution of printing, printing conditions are set while distinguishing the printing condition setting method in the item value setter 35. As a result, the designer of the application providing the APL 25 and UI for same during printing can specify item values for printing condition items using a common method and create programs for controlling PRTDRV 21, without having to be aware of differences among OS.

In this embodiment, by means of arrangements such as those described above, printing conditions are settable simply by specifying a stylized printing template; however, in order to meet diverse user needs, more advanced printing condition settings are possible. In this instance as well, in order to enable rapid acquisition of printing condition item settable ranges and interdependency relationships, the arrangement is such that item values input from the UI by way of advanced settings are held as provisional settings, with settable ranges and interdependency relationships being returned to the UI display controller 25b in the event that these provisional settings were made with reference to a database created in advance.

Specifically, making of advanced settings from the UI according to user intent is enabled by means of an "Advanced Settings" button or the like; when the intent to make advanced settings is indicated by means of the Advanced Settings button, the UI display controller 25b displays an advanced settings UI. At this time, the item value settable range acquirer 33 refers to the resource DB 15c and transfers to the UI display controller 25b data indicating settable range for the printing condition item targeted for advanced setting. The item value acquirer 32 acquires the current item value (item value in the provisional settings) for the printing condition item. Accordingly, the UI display controller 25b is able to create and display a UI wherein the aforementioned settable ranges are displayed as decision branches, with provisionally set item values being selected as defaults.

With the advanced settings UI displayed in this manner, when a change to an item value is handled by means of the UI display controller 25b, the item value provisional setter 31 records the item value thereof as a provisional setting 14a in RAM 14. Accordingly, the provisional setting 14a in RAM 14 for the item value which has been changed from the UI is updated, though at this stage updating of the item value for the PRTDRV 21 is not performed.

Once the provisional setting 14a has been updated, the provisional setting 14a is acquired by the aforementioned item value acquirer 32 and the item value settable range acquirer 33 acquires the settable range, whereupon the UI display controller 25b can now display a UI with settable range modified appropriately with reference to the update of the item value. That is, even if the settable range for an item that has an interdependency relationship changes due to updating of an item value, the item value settable range acquirer 33 can refer to the resource DB 15c on a case-by-case basis to acquire the proper settable range.

Updating of the UI display will be described in detail later. In the preceding description, for the sake of simplicity it is assumed that reference is made to resource DB 15c in order to acquire settable range; in this embodiment, however, when updating the UI display in actual practice the resource DB 15c and printer DB 15c are searched in that order, making reference to the settable range data so detected. In the present invention, the design is such as to provide a UI from which printing conditions can be set easily as well as enabling advanced settings where necessary; in the sense of providing the UI desired by the APL creator, an arrangement that compensates for differences among OS by means of software I/F 27 in the manner described above is not essential. For example, an arrangement whereby, rather than setting item values of printing condition items via software I/F 27, item values of printing condition items are instead set directly for each PRTDRV 21 by the UI control module 30 would also be acceptable.

(2) Arrangement of Stylized Print Data

Next, the arrangement of stylized print data 15d in this embodiment shall be described in detail. FIG. 2 is an illustration showing a data description example of stylized print data 15d. As shown in the drawing, stylized print data 15d describes a stylized printing designation and data indicating printing condition item values essential for carrying out stylized printing. In the illustrated example, there are specified a stylized printing designation of "postcard reverse (photo)" and, by way of printing condition item values necessary for printing a photograph on postcard paper, a "1" for ink used and a "2" for print medium size. In the drawing, an ink setting of "1" (non-monochrome) indicates the use of CMYKlclmG inks, and a print medium size setting of "2" indicates that a postcard is used as the print medium.

In this example, when "postcard reverse (photo)" is selected in the UI, for printing condition items other than ink used and print medium size, these are provisionally set to item values included in settable ranges for each model of printer 40, which item values have the highest precedence. That is, since in order to print a photo on the reverse of a postcard it is sufficient at a minimum to use color inks and to set a postcard as the print medium, an arrangement whereby mandatory predetermined values are used for these printing condition items, with other items being set according to an order of precedence, is employed.

Of course, various other modes besides one could be adopted as examples of stylized printing. For example, it would be possible to specify stylized printing of various designations such as "postcard address", "A4 highest quality", "A4 glossy paper, borderless", "A4 plain paper (fast)", "A4 plain paper (high quality)", or the like, and to determine in advance item values for at least those printing condition items necessary to carry out the stylized printing in question, these being described in stylized printing data 15d.

While in the present invention, stylized printing designations and mandatory items are intimately related, [the invention] is not necessarily limited to unequivocal determination on the basis of designation. For example, stylized printing designations may contain somewhat vague wording, such as "A4 highest quality", in which case printing condition item values for quality cannot be defined unequivocally from the phrase "highest quality." However, where an order of precedence starting from the printing condition item value with the best image quality is created and "A4" is specified as the print medium size, it will be possible to execute "A4 highest quality" stylized printing.

(3) Arrangement of Printer DB

Next, the arrangement of the printer DB 15*b* in the embodiment will be described in detail. FIG. 3 is an illustration showing a printer DB 15*b* data description example. As shown in the drawing, printer DB 15*b* describes data indicating printer name, driver version, ink set and interdependency relationships. The printer name is data indicating the model name of printer 40 (in this embodiment, "PM-****"); PRTDRV 21 is the driver corresponding to this printer 40. Since printing condition items and interdependency relationships are model-dependent, in this embodiment, it is described which printer DB 15*b* is used for which model of printer. Where a multiplicity of printers are connected to computer 10 with a multiplicity of PRTDRV being installed for the printers in such a way that any one or combination of these may be used, this description is used in order to identify the printer for which a printer DB has been described.

Driver version is data identifying the version of PRTDRV 21 (in this embodiment, version 5.3e). A new version of a printer driver may in some instances add new functionality, the aforementioned interdependency relationships may change, and error correction and the like may differ among versions, so in this embodiment the driver version that printer DB 15*b* is used for is described. In the event that the user of computer 10 procures and installs a version upgrade of PRTDRV 21, this description will be used to identify the driver version for which the printer DB should be used. As will be described later, even if resource DB 15*c* has been recorded onto HDD 15, if a resource DB 15*c* for use with the driver version described in printer DB 15*b* has not been recorded on HDD 15, the resource DB 15*c* will be rebuilt, so that even if new functions are added or settable range interdependency relationship change with a change in driver version, interdependency relationships after the change can be accommodated.

Ink set is data that uniquely specifies the combination and types of ink cartridges installed on a printer 40 (in this embodiment, a CMYKlclmG ink set composed of pigment based inks). Depending on the combination of ink colors used, color management and image processing enablement/disablement may differ and the aforementioned interdependency relationships may vary, so in this embodiment, a printer DB 15*b* is described in terms of which ink set it is used for. In the event that the user of computer 10 has modified the combination of ink colors installed in a printer 40, this description will be used to identify which printer DB should be used for which ink set. As will be described later, even where resource DB 15*c* has been recorded onto HDD 15, under a condition in which a ink set resource DB 15*c* described in printer DB 15*b* is not recorded on HDD 15 due to a change of ink set from CMYKlclmG to CMYIlclmK or the like, the resource DB 15*c* will be rebuilt, so as to be able to correspond to interdependency relationships after the change of ink set.

interdependency relationships are specified by means of associating target printing condition items (target items) that specify interdependency relationships with superordinate items thereof, while cataloging them. In this embodiment, interdependency relationships are specified by means of describing, in order, data indicating "target item n, superordinate item number m, superordinate item n1 ... superordinate item nm." Here, n and m are zero or natural numbers, with m superordinate items being dependent on each of the n target items, and the superordinate items being cataloged. For target items for which no superordinate item exists, m is 0 and no superordinate item is described. For target items and superordinate items, it is sufficient to be able to identify the target item per se; for example, where the target item is print quality and the superordinate item is type of print medium, with superordinate items numbering one, the description would be "print quality, 1, print medium type."

In this embodiment, the printer DB 15*b* is referred to in order to create the resource DB 15*c*, and thus for this purpose it is acceptable if it describes the aforementioned data specifying a printer name, driver version, and an ink set, and data specifying interdependency relationships; in this embodiment, in order to further enhance convenience, settable ranges may be described. A settable range is shown at bottom in FIG. 3, in a format that describes, in order, data indicating "target item x, superordinate item number 1, superordinate item x1 and value thereof ... superordinate item x1 and value thereof, settable range."

That is, whereas the fact of describing interdependency relationships for a given target item x by means of describing the number of superordinate items and subordinate items is an element in common with the interdependency relationship format described previously, in the format for settable range, item values of superordinate items are identified, and a target item value when a superordinate item is finally that item value is described. By so doing, it is possible to specify a settable range for a target item when an item value in a superordinate interdependency relationship is a specific value. This format is in common with the settable range format described in resource DB 15*c*, described later. Resource DB 15*c* is created by means of interdependency relationships described in printer DB 15*b*, but in some instances, an error or the like occurring in PRTDRV 21 during creation thereof may result in an inability to properly acquire a settable range, in which instance an appropriate settable range cannot be described in resource DB 15*c*.

Accordingly, after creating PRTDRV 21 an appropriate settable range is described in printer DB 15*b*, and during creation of resource DB 15*c* by the aforementioned resource DB creator 34, first, reference is made to the printer DB 15*b*, and when a settable range is described in the printer DB 15*b*, the content of the description in the printer DB 15*b* is acquired. By means of this arrangement, even if it should not be possible to properly acquire a settable range due to an error or the like occurring in PRTDRV 21, it will nevertheless be possible to readily transfer an appropriate settable range to the item value settable range acquirer 33. In the event that registering all settable ranges for all items in resource DB 15*c* will take an extremely long time, an arrangement whereby only some settable range data is described in resource DB 15*c* would be possible. In such an arrangement, when performing UI display, since settable range data is not described in the resource DB 15*c*, settable range data will be acquired by referring to the printer DB 15*b*.

(4) Arrangement of Resource DB

Next, the arrangement of resource DB 15*c* in this embodiment shall be described in detail. FIG. 4 is an illustration showing a resource DB 15*c* data description example. As shown in the drawing, resource DB 15*c* describes data indicating printer name, driver version, ink set and settable range. Settable range is a format describing, in order, data indicating "" target item n, superordinate item number m, superordinate item n1 and value thereof ... superordinate item m1 and value thereof, settable range."

By so doing, it is possible to specify a settable range for a target item when an item value in a superordinate interdependency relationship is a specific value; for example, in the case that the target item is print quality, the superordinate item is type of print medium, and superordinate items number one, where the item value for print quality is "2, 3" when the item value for type of print medium is "1", the description will be "print quality, 1, type of print medium=1, 2, 3". Here as well, target items with no interdependency relationship are assigned an item number of "0", and the item number of the superordinate item is described directly as the settable range, without describing any superordinate item and value thereof.

Adjustments of various kinds can be made to the number of target items described in resource DB 15c. All items present as printing condition items of PRTDRV2 may be described; or in order to avoid taking an extremely large amount of time in order to create resource DB 15c, only target items having a number of superordinate items not exceeding a predetermined number (e.g. 4 or fewer) could be described. Alternatively, an arrangement whereby printing condition items that have low frequency of utilization on the UI are identified in advance, and these low use frequency items and/or printing condition items that are not shown on the UI (printing conditions that must be set in order execute printing, but that cannot be set by the user, being determined instead by the APL or the like) are not described in resource DB 15c could be used.

In the manner described hereinabove, in the printer DB 15b, resource DB 15c, and stylized printing data 15d, item values for printing condition items are specified in terms of numeric values, with the meanings of numeric values being determined in advance. For example, type of print medium=1 is determined in advance as meaning "plain paper." Accordingly, while the act of specifying printing conditions for printing condition items is referred to herein as "determining item values", it is of course sufficient in the present invention to be able to specify printing conditions, it not being mandatory to identify printing conditions by means of numeric values, rather being possible to employ various other arrangements such as specification with text strings.

Further, data indicating printer name, target item, stylized printing designation, and other kinds of information mentioned hereinabove can be described in either the printer DB 15b, resource DB 15c, or stylized printing data 15d, with the form of data description not being limited to the format described above. Of course, in the sense of describing data, it is sufficient to indicate information of various kinds, it being possible in computer 10 to employ a text format, to employ a binary format, or to employ any of various other arrangements.

Figure 5:
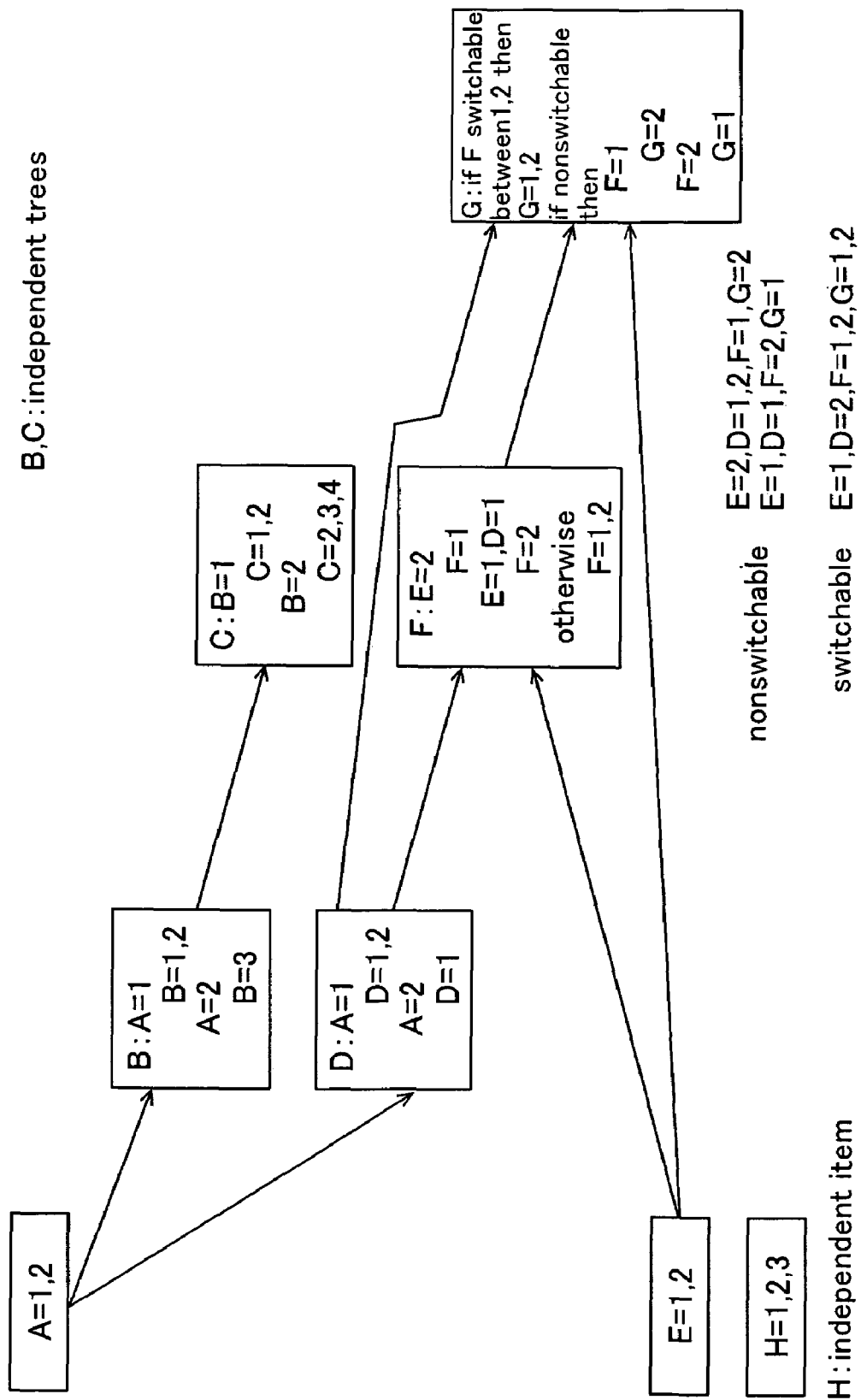
FIG. 5 is an illustration showing settable range together with interdependency relationships.

FIG. 5 is an illustration showing interdependency relationships together with settable ranges determined in the manner described above. In the drawing, A-H indicate printing condition items, with interdependency relationships shown by arrows. A printing condition item situated at the tip of an arrow is a subordinate item, and a printing condition item at the opposite end is a superordinate item. For example, printing condition item A represents a superordinate item for printing condition items B and D. Where items in an interdependency relationship have a one-to-one relationship of a superordinate item with a subordinate item, that is an interdependency relationship like that of B, C shown in FIG. 5, this is termed an independent tree; and where for a given item there are several subordinate items or superordinate items, i.e. an item like printing condition item F (having D and E as superordinate items) shown in FIG. 5 is termed a non-independent tree.

In the aforementioned printer DB 15c which indicates interdependency relationships for printing condition items, either independent trees or non-independent trees can be described, allowing complicated interdependency relationships to be described by an extremely simple format. That is, in the case of an independent tree, it would be acceptable for example to show printing condition item B as a superordinate item of printing condition item C; or in the case of a non-independent tree, it would be acceptable for example to show printing condition items D, E as two superordinate items of printing condition item F.

Additionally, in the aforementioned resource DB 15c which indicates settable ranges, since the settable range of a target item is indicated while indicating a superordinate item and a specific item value of the superordinate item, complex interdependency relationships and settable ranges like those shown in FIG. 5 can be described easily. In the drawing, for each printing condition item, item values of the superordinate item and item values of the target item in the item value are shown. For example, in printing condition item B, it is indicated that when the item value of superordinate item A is "1" the settable range for item B is "1, 2", and when the item value of superordinate item A is "2" the settable range for item B is "3."

In printing condition item F shown in FIG. 5, as shown in the drawing when superordinate item E is "2" item F is "1", and when superordinate item E is "1" and superordinate item D is "1" item F is "2", in other cases item F being "1, 2." In this way, there are complex interdependency relationships whereby when a superordinate item is a specific item value, the item value of item F is dependent on the superordinate item. However, even such interdependency relationships can be described in simple format in resource DB 15c. That is, values for superordinate items and values for F in all instances, including the case where the aforementioned E=2 and the case where E=1 and D=1, are described in resource DB 15c.

The case is similar for even more complex interdependency relationships, such as printing condition item G. With printing condition item G, conditions are that if superordinate value F is switchable between "1, 2" G is "1, 2", and if not switchable, then when item F is "1" item G is "2" and when item F is "2" item G is "1". That is, item G is dependent on the condition of whether item F is switchable, and also on the item value of F. Regarding the condition of whether item F is switchable or not, while this cannot be specified solely by an interdependency relationship between item F and item G, if items D, E—which are superordinate items for item F—are used as well, it becomes possible to specify a settable range for item G.

Accordingly, in this case items D, E, F represent superordinate items for item G; having specified item values for items D, E, F, by then describing a settable range for item G, it is possible to specify complex conditions, including whether or not item F is switchable as described above. Specifically, as shown at lower right in FIG. 5, nonswitchable refers to a case in which there is no discretion as to the settable range for item F, the item value being "1" only or "2" only, with item F being "1" only in E=2 as mentioned previously. Accordingly, in this case, the description in resource DB 15c will describe items E, D, F as superordinate items for item G, and give an item value of "2" for item E, item values of "1, 2" for item D, an item value of "1" for item F, and a settable range of "2" for item G.

As regards the case where item F is "2" only, the description in resource DB 15c will describe items E, D, F as superordinate items for item G, give item values of "1", "1", "2" for these respectively, and give a settable range of "1" for item G. Where switchable, it is acceptable to cite data wherein item values of the aforementioned superordinate items D, E, F are different from the values in the above example, and the settable range for item G is "1, 2." In the above manner, in this embodiment, by employing in the resource DB 15c a format that describes superordinate items and values thereof, it is possible to create a resource DB 15c in which even complex interdependency relationships can be described simply.

(5) Print Control Process and UI Display Example

Next, a print control process and UI display example will be described. The print control process is carried out in accordance with the flow depicted in FIG. 6 and FIG. 7; FIG. 8 is an example of the UI displayed at this time. A user can issue a print instruction for an image targeted for retouching during execution of APL 25, and when image processor 25a receives the print instruction (Step S100), the UI display controller 25b controls UI display in collaboration with the UI control module 30. At this time, the resource DB creator 34 acquires from the instruction the printer name of the printer for use at the time of printing (Step S105). Also acquired are the version of the PRTDRV 21 that controls the printer, and the ink set.

As the printer name, it is acceptable to acquire the name of the printer model set as the default printer in the OS 20; of course, where the user has selected a specific printer, its model name will be acquired. For the PRTDRV 21 version and ink set, there may be employed an arrangement whereby the PRTDRV 21 is queried and the PRTDRV 21 responds with its own version and installed ink set; there may be employed an arrangement whereby information indicating the ink set is acquired through communication with the printer 40; there may be employed an arrangement whereby information indicating version is recorded in advance in a predetermined storage medium during installation or version upgrade of the PRTDRV 21, and reference made to this information; or there may be employed any of various other arrangements.

In any event, once information indicating the name of the printer to be used, the driver version, and the ink set is acquired, the resource DB creator 34 in Step S10 refers to the HDD 15 to determine whether a resource DB 15c for the particular printer name, driver version, and ink set has been established previously and recorded on HDD 15. In Step S110, if it is not decided that a resource DB 15c has been established previously, the resource DB creator 34 then proceeds to Step S115 and executes a process to establish a resource DB 15c, making reference to the printer DB 15b that corresponds to the printer name, driver version, and ink set.

When in Step S110 it is decided that a resource DB 15c has been established previously, Step S115 is skipped. That is, a resource DB 15c is then established when executing printing for the first time after having connected a printer 40 to computer 10 and installing PRTDRV 21, when executing printing for the first time after changing the PRTDRV 21 version by means of a version upgrade of PRTDRV 21 etc., or when executing printing for the first time after having changed the combination of ink colors installed on printer 40.

In the example shown in FIG. 1, a single printer 40 is connected, and there is only one PRTDRV 21 installed, so a resource DB 15 will be established when printing is executed for the first time after having installed or upgraded the PRTDRV 21 or changed the ink set. Since a certain amount of time is needed when building the resource DB 15, an arrangement that shows the user that the process is proceeding by means of a progress bar or the like shown on the display would be preferred.

During second and subsequent print operations taking place after PRTDRV 21 has been installed or upgraded, or after the ink set has been changed, the process proceeds without establishing a resource DB 15c. In Step S115, it is sufficient to be able to establishing a resource DB 15c by referring to printer DB 15b; for example, this could be realized by a process wherein having determined a item value for a superordinate item for a given item, operations to acquire settable ranges for subordinate items thereof are carried out successively going from superordinate to subordinate, for example.

Since the printer DB 15b is recorded on HDD 15 at the time that the PRTDRV 21 is installed, Step S120 and subsequent processes are executed with printer DB 15b and resource DB 15c recorded on HDD 15. In Step S120 and subsequent processes, the UI display controller 25b displays a UI for selecting stylized printing, as well as displaying a UI for making advanced settings depending on user selection. To accomplish this, first, in Step S120 the stylized printing item acquirer 36 refers to the stylized printing data 15d, and for the purpose of displaying list of stylized printing templates, transfers to the UI display controller 25b data indicating a plurality of stylized printing templates described by the stylized printing data 15d.

By so doing, the UI display controller 25b, in Step S125, displays a list of all acquired stylized printing designations (while omitting those that would be displayed in duplicate), as well as displaying on the display a UI enabling alternative selection from among these. In Step S130 the UI display controller 25b decides whether the user has operated the aforementioned input device to select a stylized printing template and whether the selection has been handled, repeating the process of Step S125 and subsequent steps until it is determined that selection of a stylized printing template has been handled.

In Step S130, when it is determined that selection of a stylized printing template has been handled, in Step S132, the item value provisional setter 31 refers to the stylized printing data 15d and acquires the printing condition item value essential for the selected stylized printing. This item value is stored as a provisional setting 14a in RAM 14. In Step S135, the item value provisional setter 31 acquires from the item value settable range acquirer 33 settable range data for items other than the aforementioned essential printing condition items (nonessential items). In Step S140, while making reference to this settable range data, printing condition item values are set from superordinate items so as to give the item value of highest precedence within the settable range. The item values set here are recorded as provisional settings 14a in RAM 14.

Once the process of provisionally setting printing conditions for stylized printing by means of the above process has been completed, in this embodiment, in order to enable more advanced settings to be made, it is determined in the UI display controller whether an instruction to carry out advanced setting has been handled (Step S145). If in Step S145 it is determined that an instruction to carry out advanced setting has been handled, an advanced setting process is performed in Step S150, whereby the user makes the desired advanced settings by means of the process, the contents of which settings are then recorded as provisional settings 14a.

Figure 7:
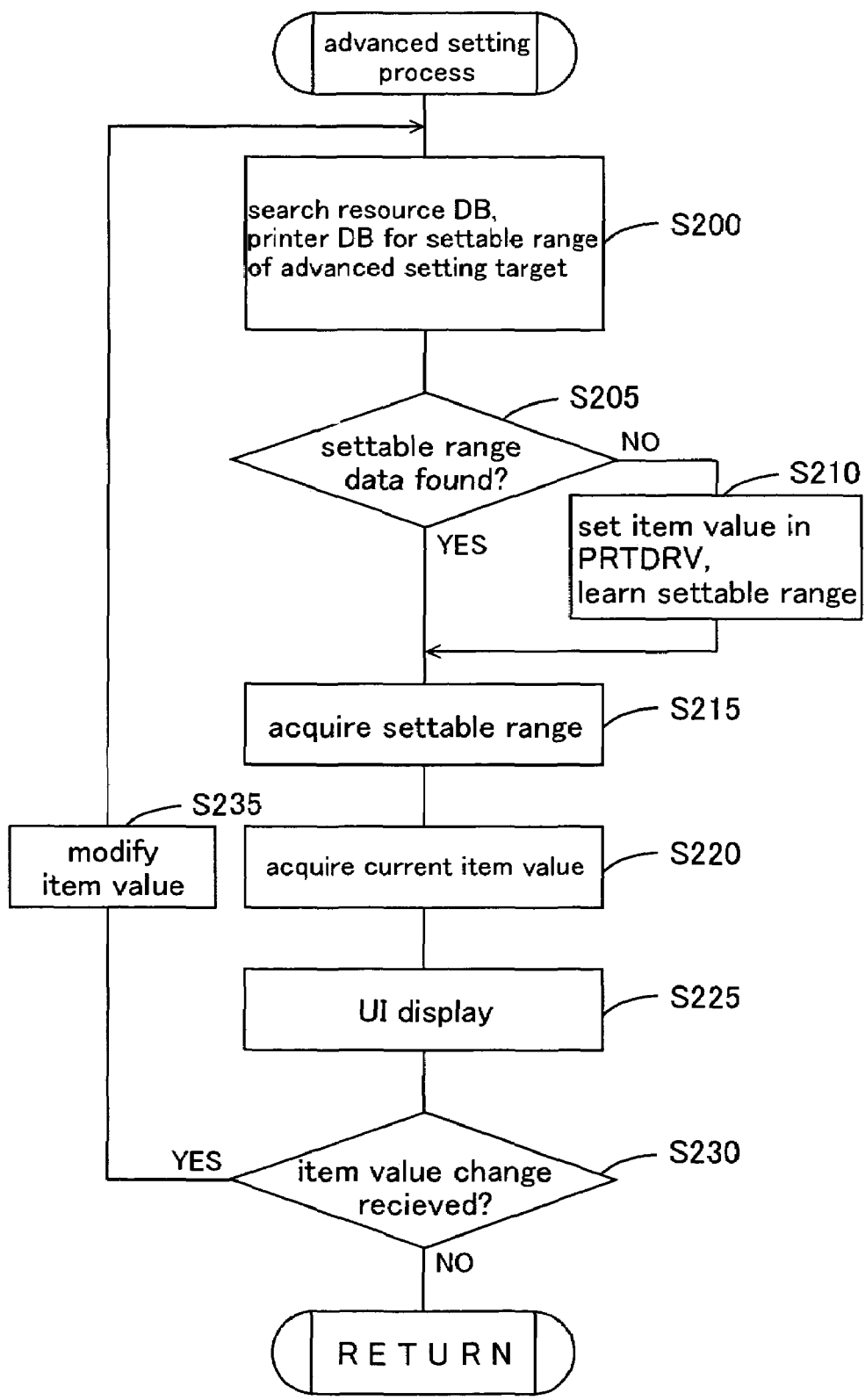
FIG. 7 is a flowchart of a print control process.
Figure 8:
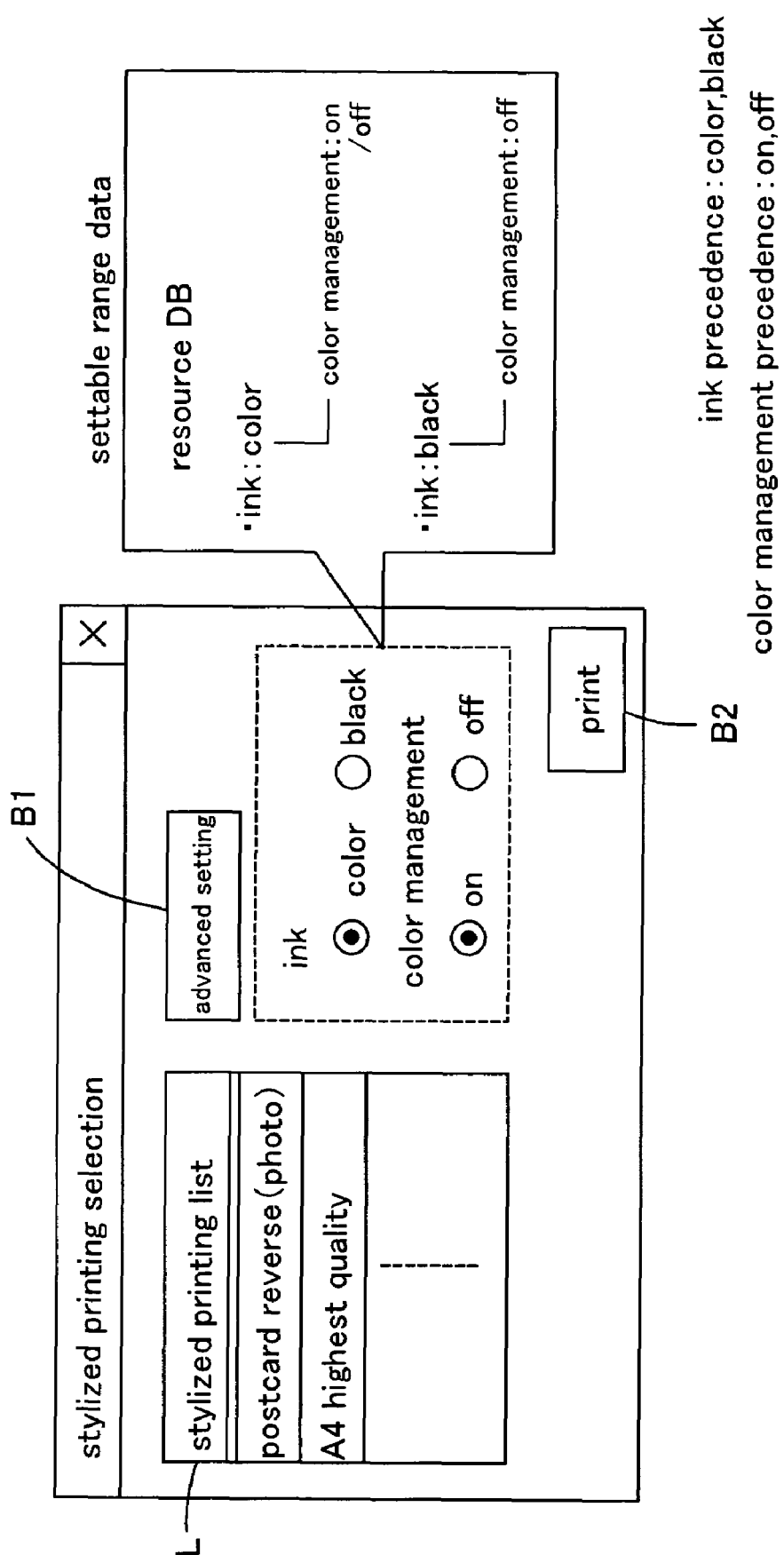
FIG. 8 is a drawing showing a UI display example.

FIG. 7 shows the flow of the advanced setting process. In this embodiment, there is employed an arrangement whereby the creator of the APL 25 decides in advance the printing condition items targeted for advanced setting, but of course an arrangement whereby settings are possible for all printing condition items would also be acceptable. In this advanced setting process, first, in Step S200 the item value settable range acquirer 33 searches the resource DB 15c and printer DB 15b in that order, and determines whether printing condition items targeted for advanced setting in Step S205 are described as the aforementioned target items.

In Step S205, if it is not determined that the printing condition items targeted for advanced setting are described as the aforementioned target items, in Step S210 the resource DB creator 34 actually sets item values for PRTDRV 21 and acquires settable ranges. That is, making reference to DB 15b, it determines whether there is a superordinate item for a printing condition item targeted for advanced setting; in the event that a superordinate item exists, it sets the item value for this superordinate item in PRTDRV 21 via software I/F 27, and then acquires the settable range that the printing condition item targeted for advanced setting can assume with the item value of the superordinate item set in this manner.

For these superordinate item values, all possible item values assumable by the superordinate item are set sequentially, acquiring settable ranges that the printing condition item targeted for advanced setting can assume given those item values of the superordinate item. In the event that a superordinate item does not exist for a printing condition item targeted for advanced setting, the settable range for the printing condition item is acquired via software I/F 27, without setting item values for any other items. The settable range so acquired is described in resource DB 15c.

Accordingly, even where a printing condition item targeted for advanced setting has not been described in printer DB 15b and resource DB 15c, the determination that it is not described will not be made at the time of next printing. In this embodiment, item values are set sequentially for all printing condition items targeted for advanced setting, so as to be able to use these the next and subsequent times; however, an arrangement wherein item value for a superordinate item is set to the current setting for UI display, i.e. in accordance with the setting of the provisional setting 14a, and the item value targeted for advanced setting is acquired at this setting would of course be acceptable as well.

Since this Step S210 involves a process of acquiring a settable range upon actually setting an item value for the PRTDRV 21, it may be somewhat time consuming. However, conditions under which a printing condition item targeted for advanced setting is note described in resource DB 15c can occur are limited to specific cases, such as when avoiding an excessively long period of time to create the resource DB 15c, and thus substantially all items needed to carry out UI display will be described in the resource DB 15c. Accordingly, in actual practice Step S210 is rarely performed.

In Step S215, the item value settable range acquirer 33 acquires settable ranges for a printing condition item detected to be described in resource DB 15c or printer DB 15b in Step S200, or for a printing condition item described in resource DB 15c in Step S210. In Step S220, item value acquirer 32 refers to provisional settings 14a in RAM 14 and acquires the current item value. In Step S225, the settable range acquired in Step S215 is made a selectable decision branch, and the provisional setting acquired in Step S220 is displayed in provisionally set format on the UI.

As a result, there is created a UI wherein with a provisional setting having been made for the aforementioned printing condition item targeted for advanced setting, the item value thereof can be set. In Step S230, the UI display controller 25b determines whether a change to the item value has been received, and if it determines that a change to the item value has been received, in Step S235 the item value provisional setter 31 acquires the changed value by way of the provisional setting, updates the settings 14a in RAM 14, and repeats the process starting at Step S200.

In this repeat process, even if interdependency relationships of a printing condition item targeted for advanced setting should change due to a change in the item value of Step S235, an appropriate settable range will be acquired by means of the process of Step S215, and in the UI display of Step S220 it will be possible to update the UI without showing unselectable printing condition items as being selectable. Also, in the repeat process, when acquiring current item value in Step S220, the item value is not set for PRTDRV 21 via the software I/F 27. Accordingly, the UI display can be switched quickly.

Figure 6:
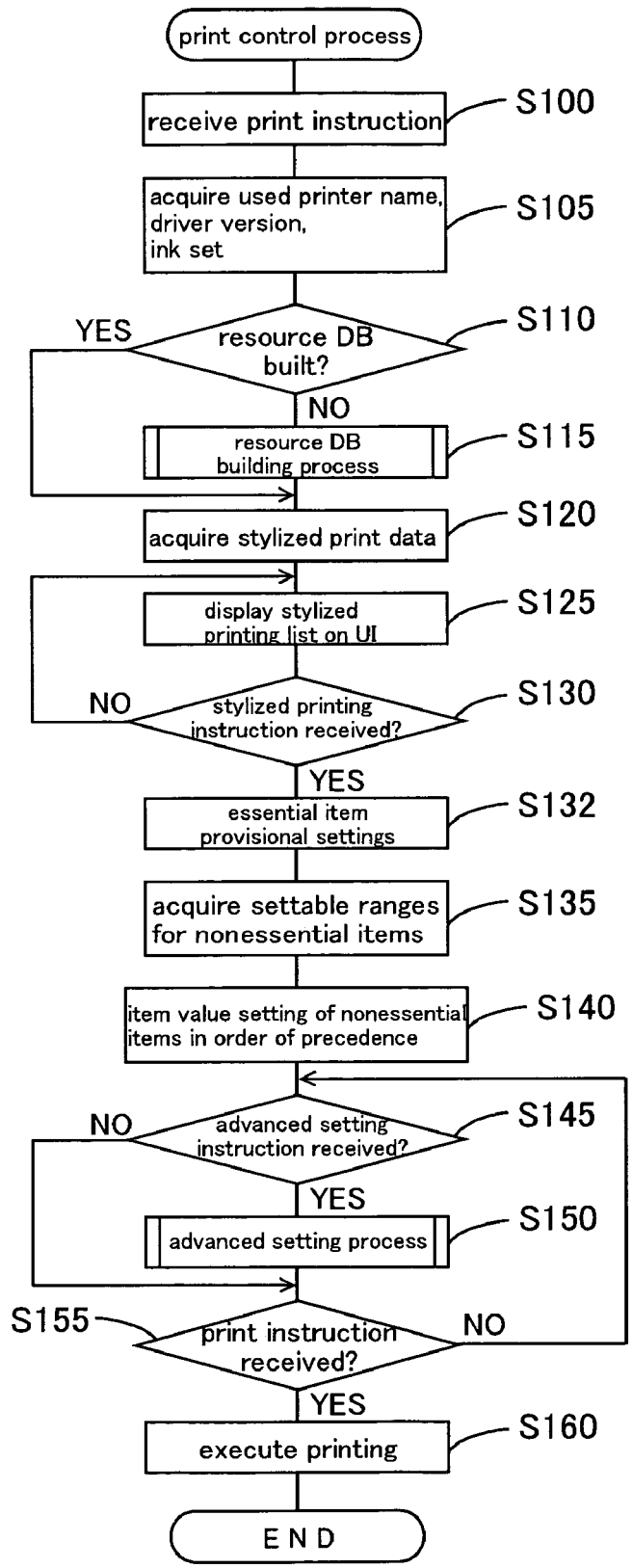
FIG. 6 is a flowchart of a print control process.

In Step S230 if it is not determined that a change to the item value has been received, the routine returns to the flow shown in FIG. 6. After this advanced setting, or in Step S145 shown in FIG. 6, if it is not determined that an instruction to carry out advanced settings has been received, in Step S155 of FIG. 6 the UI display controller 25b determines whether a print instruction has been received, and if a print instruction has been received, executes printing in Step S160. If it is not determined in Step S155 that a print instruction has been received, the process starting at Step S145 is repeated.

In Step S160, the print executor 25c outputs the image data targeted for printing to the PRTDRV 21, as well as issuing an instruction to set printing conditions to the item value provisional setter 31. Also, the item value provisional setter 31 accesses the software I/F 27, and sets the printing condition item values recorded in the provisional settings 14a for the PRTDRV 21. As a result, the PRTDRV 21 performs image processing of print target data in accordance with the printing conditions, as well as creating print data for executing printing according to the print conditions, and outputs this to the printer 40 for printing.

By means of the above process, it is possible to complete all necessary printing condition settings simply by specifying a stylized printing template from the UI, as well as to provide the user with a UI with settable printing conditions such that the user can make more advanced settings where so desired. Additionally, for items other than printing condition items essential for carrying out stylized printing, item values are set within settable ranges and according to an order of precedence. Accordingly, simply by specifying stylized printing, printing settings that cannot be carried out by the printer 40 can be avoided so that printing can be executed properly.

Further, where precedence is determined according to predetermined criteria, it becomes possible to maximize the capabilities of the printer 40. For example, by assigning higher precedence to item values which, when item values of printing condition items are compared with one another, afford relatively higher picture quality, it becomes possible to set items other than printing condition items that are essential for performing stylized printing in such a way that printing with the highest possible picture quality is carried out, and as a result to obtain a printout of the highest picture quality for executing stylized printing. Additionally, by assigning higher precedence to item values which, when item values of printing condition items are compared with one another, afford relatively faster processing, it becomes possible to set printing condition items in such a way that printing is carried out as quickly as possible, and as a result to complete at maximum speed the processing entailed in executing stylized printing.

Of course, rather than having a uniform precedence as in the present embodiment, it would be possible instead to enable users to select precedence, or to vary precedence depending on the type of stylized printing (for example, whether stylized printing gives precedence to speed, or whether stylized printing gives precedence to quality). In such cases, there could be created data to indicate precedence during selection by the user, or there could be created in advance data indicating precedence for each type of stylized printing, with the item value provisional setter 31 making reference to this data when making settings.

Since an item value for a printing condition item can be adjusted through advance settings even when printing condition items for stylized printing have been set, it becomes possible to enable specification from the UI so as give the printed results desired by the user, while keeping printing settings simple. For example, in the case of a stylized printing template for printing a photo, which in the absence of any advanced settings will be printed in color, it would be possible to enable the user by means of advanced settings to set the ink color to black only so that the color image will be printed in monochrome, or to provide the user with various other methods of utilization. Of course, various other uses are possible; with stylized printing, for example, having printed at best quality, settings may then be modified so as to give preference to speed, in order to carry out test printing.

FIG. 8 is a drawing showing a UI display example. With the UI pertaining to this embodiment, the user is initially provided with a stylized printing list, presented in a selectable manner. In the example shown in FIG. 8, a stylized printing list L is shown at the left of the screen. At this stage, an advanced settings selection button B1 and a print command button B2 are shown at right in FIG. 8; the UI enclosed by the broken lines (advanced settings UI) is not yet displayed. Using the mouse etc., the user selects, for example, "postcard reverse (photo)" or other desired stylized printing template from the stylized printing decision branches; once selection has been made, in Steps S130-S140 described above, the printing condition items for executing stylized printing are provisionally set.

At this point, if the user selects the print button B2 with the mouse, in the aforementioned Step S155 a print instruction is determined to have been received, and printing is executed in Step S160. After stylized printing selection, if the user then selects the advanced settings button B1 with the mouse, in the aforementioned Step S1455 an advanced setting instruction is determined to have been received, and the advanced setting process of FIG. 7 is executed. At this time, the UI shown enclosed by broken lines in FIG. 8 is displayed by means of the process of Step S200-Step S225.

Specifically, in this example, the printing condition items targeted for advanced setting are "ink used (color or black)" and "color management" on/off. Here, "color management" is a printing condition item that specifies whether or not to perform a process to match the color of the printed output with the color of an image indicated by original image data of an image targeted for printing; "ink used" is a superordinate item for "color management." That is, as shown at right in FIG. 8, when the "color" setting has been made for the "ink used" settable range data, color management will settable to either "on" or "off", whereas if the "black" setting has been made for "ink used", the data will indicate that only the "off" setting is possible for color management.

In the example shown in FIG. 8, "color" has precedence over "black" with regard to ink, and "on" has precedence over "off" with regard to color management. Accordingly, after stylized printing has been specified, the item value provisional setter 31 provisionally uses the "color" setting for "ink used" and the "on" setting for "color management." Since these settings are recorded as provisional settings 14*a* at the stage in which the advanced settings button B1 is selected, by means of the process of Step S220 described earlier, "color" and "on" will be acquired as the current item values for "ink used" and "color management" respectively.

As a result, in Step S225, the UI shown by the area enclosed by broken lines in FIG. 8 is displayed. Specifically, in the advanced settings UI, "color" shown as is the setting for "ink used" and "on" is shown as the setting for "color management", with the UI displaying both "color" and "black" as the settable range for "ink used", and both "on" and "off" as that for "color management." Of course, where the user has set the ink used to "black" using the mouse etc., the provisional setting will be modified in Step S235, "ink used" will be set to "black" by means of the process of Steps S215-225, "color management" will be set to "off", and the UI will now display both "color" and "black" as the settable range for ink used" and "off" only as that for "color management."

By means of the above process, the user need not be bothered by being presented unnecessarily with decision branches that cannot be selected. Having made advanced settings in this manner, when the user then selects the print button B2, in Step S155 a print instruction will be determined to have been received, and in Step S160 printing will be executed. Here, since item values of the provisional settings 14*a* accord with the advanced settings, printing will be executed by means of printing condition item values that reflect the advanced settings.

(6) Other Embodiments

In the present invention, it is sufficient merely to be able to provide a UI for carrying out stylized operations on a peripheral and a UI enabling advanced settings to be made in response to user instructions, and various arrangements for doing so other than the embodiment described hereinabove are possible. For example, in the embodiment hereinabove, there is employed an arrangement whereby the resource DB 15*c* is created by referring to the printer DB 15*b* recorded on HDD 15, at least prior to setting printing conditions from the UI in computer 10, but it would of course be possible to instead create the resource DB 15*c* on another computer besides computer 10, and then record it onto HDD 15.

That is, it would be possible to employ an arrangement whereby the printer manufacturer providing the printer 40 creates the resource DB 15*c* in advance, and provides to the user of computer 10 a medium having the PRTDRV 21 program and resource DB 15*c* data recorded thereon, with the resource DB 15*c* being recorded on the HDD 15 during installation of the PRTDRV 21. By means of such an arrangement, there is no need to provide a printer DB 15*b* for creating a resource DB 15*c* on computer 10, whereby it is possible to hold down the data capacity required of the HDD 15. Additionally, since there is no need to create a resource DB 15*c* when the user is operating the computer, no time is needed for creation thereof, and the user need not be made to wait from the initial UI display.

On the other hand, in the arrangement described above wherein the resource DB 15*c* is created by referring to the printer DB 15*b* recorded on HDD 15, since it is possible to easily rebuild the resource DB 15*c* in the event of a change in driver version or ink set as described above, it is a simple matter to accommodate changes in conditions. Also, even in the event that settable ranges cannot be acquired properly from the PRTDRV 21 due to an error or the like, since it is sufficient for appropriate settable range data to be recorded in printer DB 15*b*, in the event that such an error should occur it will be easy to correct.

Registration of settable range data in resource DB 15*c* is not limited to the time of building in the aforementioned Step S115 or during learning of settable range in Step S210; for example, predetermined settable range data could instead be registered after executing printing. That is, there is no need for correct values when used during preview of, for example, print area settings on the UI; if the data is of a kind for which correct values are needed at the time of printing, settable ranges therefor may be acquired when setting the print area in PRTDRV 21 at the time of printing, and recorded in the resource DB 15c. With such an arrangement, it is possible to prevent settings for the PRTDRV 21 from being made during UI display, so that the UI display process may be carried out faster; once the settable range data has been recorded in resource DB 15c, correct values can then be used rapidly.

Further, whereas in the embodiment hereinabove a single printer 40 is connected to computer 10, it would of course be possible to instead implement the invention while connecting several computers and installing several PRTDRVs. Specifically, data indicating each printer is described in the leader of the printer DB 15b and/or resource DB 15c, printers being identified by means of this data. Accordingly, when executing printing for the first time with a printer, on the assumption that a resource DB 15c is unregistered, a resource DB 15c is created by making reference to the printer DB 15b created for that printer. As a result, by referring to printer DB 15b and resource DB 15c created for each printer it is possible to display a 111 reflecting settable ranges of printing condition items on a printer-by-printer basis.

Further, where character strings corresponding to item values are recorded together with item values as settable ranges for printing condition items in resource DB 15c as described above, it becomes possible to clearly indicate item values by means of text during display of settable ranges on the UI, so as to provide a UI that is easier to understand.

Further, whereas in the embodiments hereinabove the invention is implemented in a printer as the peripheral connected to a computer, the invention could of course also be implemented in any peripheral having working conditions settable by means of a UI. For example, the invention could be implemented in a display, projector, scanner, digital camera, hard disk drive, or the like. In the present invention, since appropriate settable ranges are identified by settable range data for working conditions with complex interdependencies, it is preferable to implement the invention in cases where numerous working conditions exist, or where peripherals have numerous interdependency relationships. In this sense, a scanner or the like would be a favorable implementation example, or a multifunctional device combining a scanner, printer, copier and fax in a single unit would be a favorable implementation example.

What is claimed is:

1. UI control device for controlling display of a UI when using said UI to set working conditions for a peripheral connected to a computer, said UI control device comprising:
    a stylized working data storage medium for storing a plurality of sets of stylized working data, said stylized working data specifying working conditions for caffying out stylized operations in said peripheral;
    a stylized working instruction handler that refers to said stylized working data to display a plurality of stylized operation candidates on a predetermined output device and that handles instruction thereof;
    a setting data storage medium for storing setting data indicating settings for working conditions of said handled stylized operation;
    a working condition input/output interface that handles a working condition setting instruction and displays on a predetermined output device decision branches for setting working conditions and that handles input of working condition settings;
    a settings data updater for updating said settings data with said working condition settings;
    an interdependency relationship data storage medium for storing interdependency relationship data indicating interdependency relationships among said working conditions; and
    a settable range data storage medium for storing settable range data indicating settable ranges for said working conditions;
    wherein said working condition input/output interface in the course of displaying said decision branches refers to said settable range data, acquires the settable range of a working condition targeted for display, and displays the settable range on said predetermined output device; and
    display of said decision branches is updated by means of a working condition updater that refers to said settable range data, acquires the settable range of a dependent working condition that is dependent on a working condition that has been modified by means of input of said working condition settings, and displays the settable range of said dependent working condition on said predetermined output device.

2. UI control method for controlling display of a UI when using said UI to set working conditions for a peripheral connected to a computer, said UI control method comprising:
    storing in a predetermined storage medium a plurality of sets of stylized working data, said stylized working data specifying working conditions for carrying out stylized operations in said peripheral;
    a stylized working instruction handling step in which reference is made to said stylized working data to display a plurality of stylized operation candidates on a predetermined output device, and instruction thereof is handled;
    a setting data storing step in which setting data indicating settings for working conditions of a said handled stylized operation is stored in a predetermined storage medium;
    a working condition input/output step in which a working condition setting instruction is handled to display decision branches for setting working conditions on a predetermined output device, and input of working condition settings is handled;
    a settings data updating step in which said settings data is updated with said working condition settings;
    storing in a predetermined storage medium interdependency relationship data, said interdependency relationship data indicating interdependency relationships among said working conditions; and
    storing in a predetermined storage medium settable range data, said settable range data indicating settable ranges for said working conditions;
    wherein said working condition input/output step in the course of displaying said decision branches refers to said settable range data, acquires the settable range of a working condition targeted for display, and displays the settable range on said predetermined output device; and
    display of said decision branches is updated by means of a working condition updating step that refers to said settable range data, acquires the settable range of a dependent working condition that is dependent on a working condition that has been modified by means of input of said working condition settings, and displays the settable range of said dependent working condition on said predetermined output device.

3. UI control method according to claim 2 wherein said working condition input/output step is able to handle input of a working start instruction for said peripheral, and in response to said working start instruction drives said peripheral in accordance with settings stored in said settings data.

4. UI control method according to claim 2 wherein said setting data storing step stores settings data indicating settings determined for working conditions not specified by said handled stylized working data within said settable ranges in a predetermined order of precedence and settings of working conditions of said stylized working data.

5. UI control program embodied on a computer-readable storage medium, said UI control program controlling display of a UI when using said UI to set working conditions for a peripheral connected to a computer, and said UI control program comprising computer-executable instructions for causing a computer to implement;
   a stylized working data storing function for storing a plurality of sets of stylized working data, said stylized working data specifying working conditions for canying out stylized operations in said peripheral;
   a stylized working instruction handling function that refers to said stylized working data to display a plurality of stylized operation candidates on a predetermined output device and that handles instruction thereof;
   a setting data storing function for storing setting data indicating settings for working conditions of a said handled stylized operation;
   a working condition input/output function that handles a working condition setting instruction and displays on a predetermined output device decision branches for setting working conditions and that handles input of working condition settings;
   a settings data updating function for updating said settings data with said working condition settings;
   an interdependency relationship data storing function for storing interdependency relationship data indicating interdependency relationships among said working conditions; and
   a settable range data storing function for storing settable range data indicating settable ranges for said working conditions;
   wherein said working condition input/output function in the course of displaying said decision branches refers to said settable range data, acquires the settable range of a working condition targeted for display, and displays the settable range on said predetermined output device; and
   display of said decision branches is updated by means of a working condition updating function that refers to said settable range data, acquires the settable range of a dependent working condition that is dependent on a working condition that has been modified by means of input of said working condition settings, and displays the settable range of said dependent working condition on said predetermined output device.

6. Printing control device for setting by means of a UI printing conditions for a printer connected to a computer as well as for controlling the printer with printing conditions set from said UI, said printing control device comprising:
   a stylized print data storage medium for storing a plurality of sets of stylized print data, said stylized print data specifying printing conditions for carrying out stylized printing in said printer;
   a stylized printing instruction handler that refers to said stylized print data to display a plurality of stylized printing candidates on a predetermined output device and that handles instruction thereof;
   a setting data storage medium for storing setting data indicating settings for printing conditions of said handled stylized printing;
   a printing condition input/output interface that handles a printing condition setting instruction and displays on a predetermined output device decision branches for setting printing conditions and that handles input of printing condition settings;
   a settings data updater for updating said settings data with said printing condition settings;
   a print execute instruction handler for handling an instruction to execute printing;
   a print controller that in response to an instruction to execute printing drives a printer at printing conditions specified in said settings data, to print an image;
   an interdependency relationship data storage medium for storing interdependency relationship data indicating interdependency relationships among said printing conditions; and
   a settable range data storage medium for storing settable range data indicating settable ranges for said printing conditions;
   wherein said printing condition input/output interface in the course of displaying said decision branches refers to said settable range data, acquires the settable range of a printing condition targeted for display, and displays the settable range on said predetermined output device; and
   display of said decision branches is updated by means of a printing condition updater that refers to said settable range data, acquires the settable range of a dependent printing condition that is dependent on a printing condition that has been modified by means of input of said printing condition settings, and displays the settable range of said dependent printing condition on said predetermined output device.

7. Printing control method for setting by means of a UI printing conditions for a printer connected to a computer as well as for controlling the printer with printing conditions set from said UI, said printing control method comprising:
   storing in a predetermined storage medium a plurality of sets of stylized print data, said stylized print data specifying printing conditions for carrying out stylized printing in said printer;
   a stylized printing instruction handling step in which reference is made to said stylized print data to display a plurality of stylized printing candidates on a predetermined output device, and instruction thereof is handled;
   a setting data storing step in which setting data indicating settings for printing conditions of said handled stylized printing is stored in a predetermined storage medium;
   a printing condition input/output step in which a printing condition setting instruction is handled to display on a predetermined output device decision branches for setting printing conditions, and input of printing condition settings is handled;
   a settings data updating step in which said settings data is updated with said printing condition settings;
   a print execute instruction handling step in which an instruction to execute printing is handled;
   a print controlling step in which in response to an instruction to execute printing, a printer is driven at printing conditions specified in said settings data, to print an image;
   storing in a predetermined storage medium an interdependency relationship data, said interdependency relationship data indicating interdependency relationships among said printing conditions; and
   storing in a predetermined storage medium a settable range data, said settable range data indicating settable ranges for said printing conditions;
   wherein said printing condition input/output step in the course of displaying said decision branches refers to said settable range data, acquires the settable range of a printing condition targeted for display, and displays the settable range on said predetermined output device; and display of said decision branches is updated by means of a printing condition updating step that refers to said settable range data, acquires the settable range of a dependent printing condition that is dependent on a printing condition that has been modified by means of input of said printing condition settings, and displays the settable range of said dependent printing condition on said predetermined output device.

8. Printing control program embodied on a computer-readable storage medium, said printing control program setting by means of a UI printing conditions for a printer connected to a computer as well as for controlling the printer with printing conditions set from said UI, and said printing control program comprising computer-executable instructions for causing a computer to implement;

a stylized print data storing function for storing a plurality of sets of stylized print data, said stylized print data specifying printing conditions for carrying out stylized printing in said printer;

a stylized printing instruction handling function that refers to said stylized print data to display a plurality of stylized printing candidates on a predetermined output device and that handles instruction thereof;

a setting data storing function for storing setting data indicating settings for printing conditions of said handled stylized printing;

a printing condition input/output function that handles a printing condition setting instruction and displays on a predetermined output device decision branches for setting printing conditions and that handles input of printing condition settings;

a settings data updating function for updating said settings data with said printing condition settings;

a print execute instruction handling function for handling an instruction to execute printing;

a print control function that in response to an instruction to execute printing drives a printer at printing conditions specified in said settings data, to print an image;

an interdependency relationship data storing function for storing interdependency relationship data indicating interdependency relationships among said printing conditions; and a settable range data storing function for storing settable range data indicating settable ranges for said printing conditions;

wherein said printing condition input/output function in the course of displaying said decision branches refers to said settable range data, acquires the settable range of a printing condition targeted for display, and displays the settable range on said predetermined output device; and display of said decision branches is updated by means of a printing condition updating function that refers to said settable range data, acquires the settable range of a dependent printing condition that is dependent on a printing condition that has been modified by means of input of said printing condition settings, and displays the settable range of said dependent printing condition on said predetermined output device.

* * * * *